(12) United States Patent
Gerebe

(10) Patent No.: US 11,100,216 B2
(45) Date of Patent: Aug. 24, 2021

(54) METHOD AND APPARATUS FOR APPLYING APPLICATION CONTEXT SECURITY CONTROLS FOR SOFTWARE CONTAINERS

(71) Applicant: Amir Gerebe, Givatayim (IL)

(72) Inventor: Amir Gerebe, Givatayim (IL)

(73) Assignee: AQUA SECURITY SOFTWARE, LTD., Ramat Gan (IL)

( * ) Notice: Subject to any disclaimer, the term of this patent is extended or adjusted under 35 U.S.C. 154(b) by 1 day.

(21) Appl. No.: 16/199,432

(22) Filed: Nov. 26, 2018

(65) Prior Publication Data

US 2019/0095614 A1 Mar. 28, 2019

Related U.S. Application Data

(63) Continuation of application No. 15/083,972, filed on Mar. 29, 2016, now Pat. No. 10,210,322.

(60) Provisional application No. 62/162,897, filed on May 18, 2015.

(51) Int. Cl.
   *G06F 21/52* (2013.01)
(52) U.S. Cl.
   CPC ........ *G06F 21/52* (2013.01); *G06F 2221/033* (2013.01)
(58) Field of Classification Search
   CPC ...... G06F 21/52; G06F 21/62; G06F 21/6209; G06F 21/6218; G06F 21/629; G06F 2221/2141; G06F 2221/2145
   See application file for complete search history.

(56) References Cited

U.S. PATENT DOCUMENTS

| 8,977,842 B1* | 3/2015 | McCorkendale | G06F 21/53 380/285 |
| 9,747,468 B1* | 8/2017 | Campbell | G06F 9/54 |
| 2008/0022362 A1* | 1/2008 | Hinton | G06F 21/6236 726/2 |
| 2008/0109876 A1* | 5/2008 | Hitomi | G06F 9/468 726/2 |
| 2008/0313282 A1* | 12/2008 | Warila | G06F 8/24 709/206 |

(Continued)

OTHER PUBLICATIONS

K. Campbell, "Moving Docker Containers and Images Around", Aug. 28, 2015, https://blog.giantswarm.io/movingdockercontainerimagesaround, Mar. 22, 2016.

(Continued)

*Primary Examiner* — Minh Dinh
(74) *Attorney, Agent, or Firm* — Carlson, Gaskey & Olds, P.C.

(57) ABSTRACT

An example method of sharing a resource between software containers includes detecting a request from a first software container to access a resource of a different, second software container, an operational state of the second software container being controlled by a container engine running on the host computing device. The method also includes accepting or rejecting the request based on whether the first and second software containers, which each contain a respective software application, are part of a same logical software application. An example host computing device configured to share resources between software containers is also disclosed.

16 Claims, 13 Drawing Sheets

(56) References Cited

U.S. PATENT DOCUMENTS

| | | | |
|---|---|---|---|
| 2015/0089224 A1* | 3/2015 | Beckman | H04L 63/105 |
| | | | 713/168 |
| 2015/0169871 A1* | 6/2015 | Achutha | G06F 21/6218 |
| | | | 726/1 |
| 2015/0309849 A1* | 10/2015 | Lau | G06F 9/54 |
| | | | 715/835 |
| 2015/0379287 A1 | 12/2015 | Mathur et al. | |

OTHER PUBLICATIONS

Docker, "Legacy container links", https://docs.docker.com/engine/userguide/networking/default_network/dockerlinks, Mar. 23, 2016.
Docker, Network Configuration, https://docs.docker.com/v1.4/articles/networking, Mar. 23, 2016.

* cited by examiner

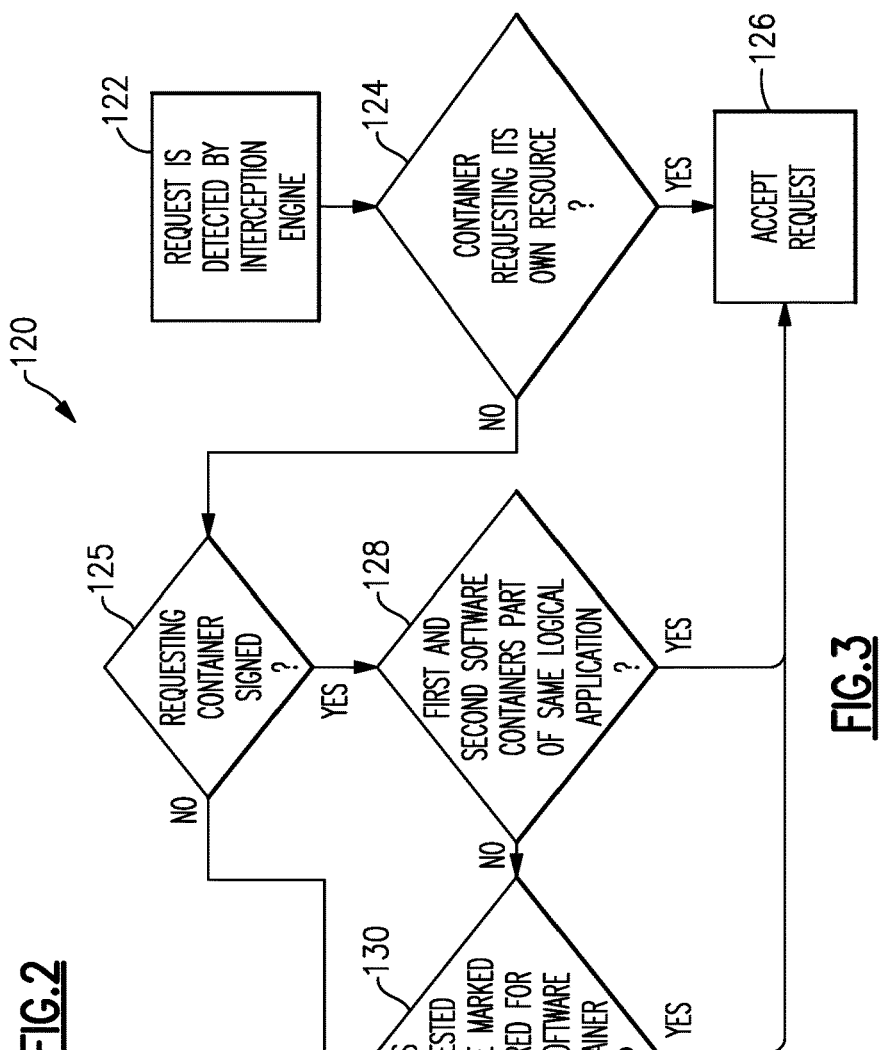

METHOD AND APPARATUS FOR APPLYING APPLICATION CONTEXT SECURITY CONTROLS FOR SOFTWARE CONTAINERS

RELATED APPLICATIONS

This application is a continuation of U.S. application Ser. No. 15/083,972, filed Mar. 29, 2016, which claims the benefit of U.S. Provisional Application No. 62/162,897, filed May 18, 2015, which are both incorporated by reference herein in their entirety.

BACKGROUND

This application relates to software containers, and more particularly to security features for software containers.

Virtual machines (VMs) have gained popularity for a variety of computing needs. A virtual machine is a software implementation of a machine that executes programs like a physical machine. A typical virtual machine includes an entire operating system that runs on top of a host operating system, and one or more applications that run within that operating system. Use of VMs enables an administrator to run several operating system instances at the same time on a single server. A specialized application called a hypervisor manages the virtual machines that run on a given server. Running multiple operating system instances on a single machine, however, is resource-intensive.

More recently, software containers are being used as an alternative to running multiple virtual machines. A software container includes a software application plus all of the dependencies required to run the application bundled into one package. The dependencies may include libraries, binaries, and/or configuration files, for example. By containerizing the application and its dependencies, differences in operating system distributions and underlying infrastructure are abstracted away, making it easy to migrate an application between various environments (e.g., development, testing, and production). Multiple containers can be run in isolation from each other on a single host operating system as well, which provides an alternative to running multiple virtual machines (and their accompanying operating systems) on a single server. Because containers allow an administrator to virtualize a single application rather than an entire operating system, running a given quantity of containers is less resource intensive than running the same quantity of VMs.

One platform for building and running software containers is DOCKER. DOCKER provides a so-called "Chinese wall" protection model between containers and the host. This method ensures isolation of container resources (e.g., files, network accessibility, etc.) from the hosting environment and from other containers running on the same host. DOCKER permits security administrators to define an access control policy that provides exceptions to the "Chinese Wall" model, allowing the sharing of resource between containers and the host (e.g., sharing data between containers). However, creating these access control policies is a manual task that differs between container platforms and security products.

SUMMARY

According to one aspect of the present disclosure, a method of sharing a resource between software containers is disclosed. The method is implemented by a host computing device. The host computing device detects a request from a first software container to access a resource of a different, second software container. An operational state of the second software container is controlled by a container engine running on the host computing device. The host computing device accepts or rejects the request based on whether the first and second software containers, which each contain a respective software application, are part of a same logical software application.

According to another aspect of the present disclosure, a host computing device is disclosed that includes memory configured to store a second software container, and processing circuitry operatively connected to the memory. The processing circuitry is configured detect a request from a first software container that is different from the second software container to access a resource of the second software container. The processing circuitry is configured to accept or reject the request based on whether the first and second software containers, which each contain a respective software application, are part of a same logical software application.

These and other features may be best understood from the following drawings and specification.

BRIEF DESCRIPTION OF THE DRAWINGS

FIG. 2 schematically illustrates an example method of sharing a resource between software containers FIG. 3 schematically illustrates an example embodiment of the method of FIG. 2.

The embodiments described herein may be taken independently or in any combination. Features described in connection with one embodiment are applicable to all embodiments, unless such features are incompatible.

DETAILED DESCRIPTION

According to one aspect of the present disclosure, software containers running in an isolated "Chinese wall" security environment can dynamically access resources on another container, as long as these resources are defined as "shared" and the containers are running under the same logical application.

According to another aspect of the present disclosure, containers running as part of a first logical software application cannot access shared resources of containers running as part of a different, second logical software application. Such resources are only accessible to containers running as part of the second logical software application.

According to another aspect of the present disclosure, container data can be seamlessly encrypted and decrypted when accessed from containers that are part of the same logical software application, and such data provided in encrypted form when accessed from containers or hosts which are not part of the same application. This applies for data access through file system and network interfaces.

Figure 1:
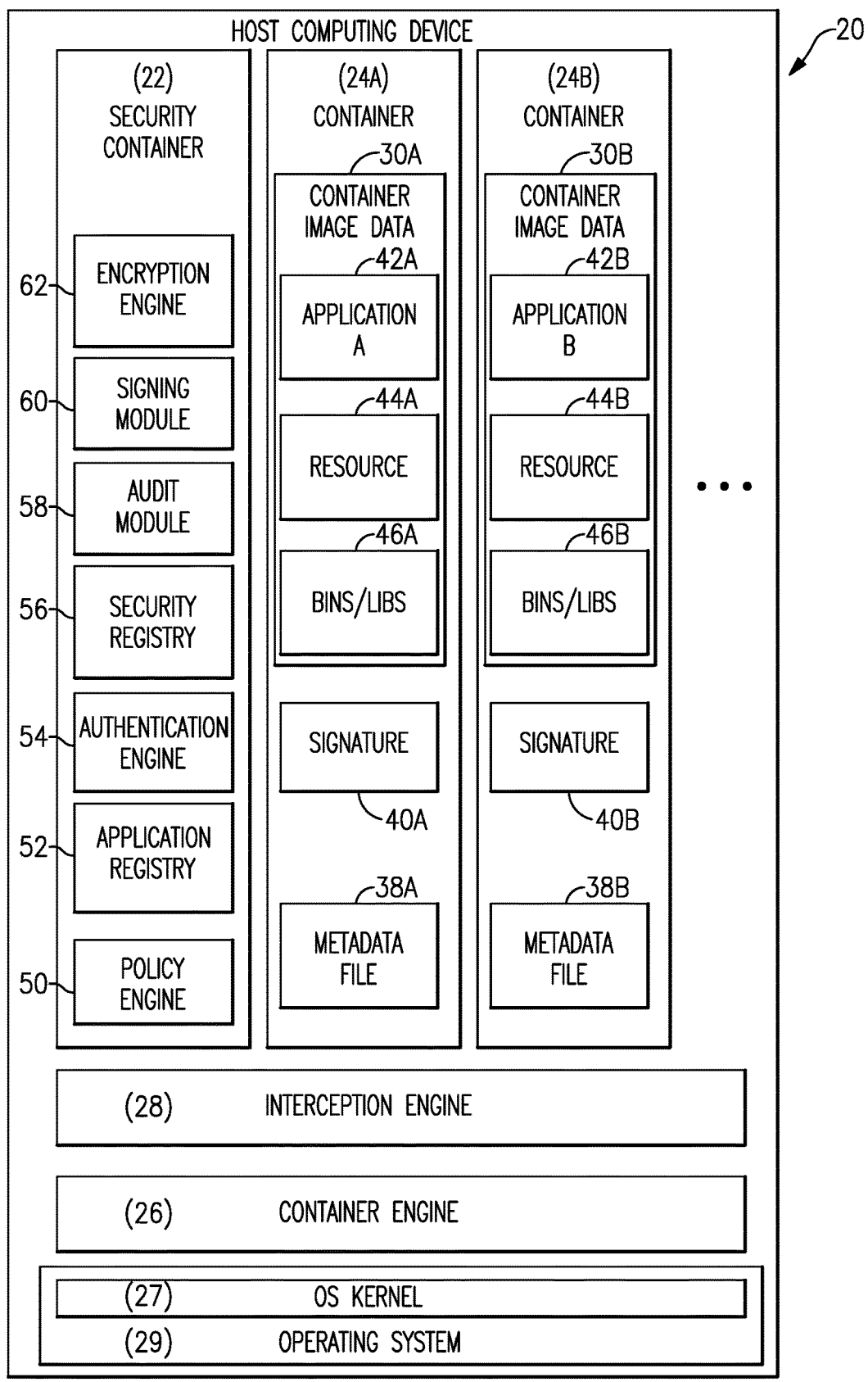
FIG. 1 schematically illustrates functional components of an example host computing device that provides security features for its software containers.

FIG. 1 schematically illustrates functional components of an example host computing device 20 that provides security features for its software containers 24. The host computing device 20 includes a security software container 22, a plurality of additional software containers 24A-B, a container engine 26, and an interception engine 28. The container engine 26 creates an environment for the applications 42, and also controls an operational state of the containers 22, 24 (e.g., whether they are running or stopped, or being imported) and also controls preserving a state of the containers (e.g., container saving and exporting). The interception engine 28 is configured to detect various resource requests between the containers 24, and the OS kernel 27 (which is part of an operating system 29 running on the host computing device 20, such as LINUX or WINDOWS) and processes those resource requests. One example container engine 26 is part of the DOCKER platform, for example. Of course, it is understood that other OS and container engines could be used. Also, it is understood that other quantities of containers 24 could be supported by the host computing device 20.

The security software container 22 includes a plurality of components 50-62 that coordinate with the interception engine 28 to control the extent to which the containers 24A-B are able to access each other's resources, and in some embodiments also control the extent to which container operational actions can be performed on the containers 24A-B (e.g., starting and/or stopping the containers 24A-B). In some embodiments, the interception engine 28 has low level hooks into the OS 29 at the kernel level, which allow the interception engine 28 to catch low-level system calls before they are executed by the kernel 27. Such hooks may be implemented through techniques such as kernel module proxying, system call replacement, process instrumentation, or the like.

As will be discussed below in greater detail, the components 50-62 add a security layer that allows enforcement of a "Chinese wall" access control model, isolating container resources from other containers and from the host, while dynamically providing access to shared container resources to other containers based on application context (e.g., if both containers are running as part of a same logical application). All this may be achieved without the need for system administrators to manually define isolation rules or resource access rules for shared resources.

The containers 24A-B each include container image data 30, and one or more associated metadata files 38. Each metadata file 38 may store any combination of the following items, for example:

contains container identification information, such as a container image name that the container is stored within, a company name of the container, a logical application of the container, a host name used for the container, and container image creator details;

configuration information, such as required and/or recommended CPU and memory resources that should be available to its container 24;

command line arguments that may be used when running its container 24; and/or a list of resources its container 24 shares with other containers of the same logical application, and an indication of whether those resources should be encrypted.

Optionally, each container may also include a signature 40 for the container image data 30, for the metadata file 38, or for each of the container image data 30 and metadata file 38. In the example of FIG. 1, the container image data 30 for each container includes an application 42, one or more resources 44, and a set of binaries and/or libraries ("bins/libs") 46. Although FIG. 1 only shows a single application 42 and resource 44 in each container 24, it is understood that additional ones could be included if desired. The resources 44 may include can be files, environment variables, shared memory, inter-process communication (IPC), network ports, or even administrative resources (e.g., the ability the start or stop a software container) for example.

For the discussion below, assume as a non-limiting example that container 24A is a webserver container that includes a webserver (e.g., Apache) as its application 42A, stores website files as resource 44A, and includes one or more website libraries as part of its bins/libs 46 (e.g., Open SSL). Further assume as part of the non-limiting example that container 24B is a database container that runs a database (e.g., MySQL) as its application 42B, stores a database as resource 44B, and includes one or more database libraries as part of its bins/libs 46B. In this example, the webserver application 42A and database application 42B may be part of a same logical application (e.g., a Customer Relationship Management "CRM" system).

In the example of FIG. 1, the security container 22 includes the following components: policy engine 50, application registry 52, authentication engine 54, security registry 56, audit module 58, signing module 60, and encryption engine 62. The policy engine 50 is configured to determine whether a resource requests between containers is authorized, and is also configured to determine whether a requested container operational action (e.g., a container start or container stop request) for a requesting entity is authorized.

The application registry 52 is configured to store information about the containers 24 and their software applications 42. This may include information in the metadata file 38 of the container 24, such as the items discussed above, for example.

The authentication engine 54 is configured to determine whether a software container 24 has been digitally signed (e.g., whether a digital signature of the container image data 30 and/or metadata file 38 is embedded within the container 24, and whether the signature is valid). The authentication engine 54 is also configured to determine what logical software application the application 42 of container 24 corresponds to.

The security registry 56 is configured to store access control policy information that includes rules indicating whether resources are to be shared for a given container 24. Such rules may be indicated in container execution arguments that are provided when a given container 24 is started, for example. These policies may be stored in the format of "who has access to what," where "who" is a user, group or a container, "access" is the resource being requested (e.g., access to a file) or container operational action being requested (e.g., start, stop, import container), and "what" is the target container or container image. The security registry 56 may also store an indication of whether encryption is to be used for various shared resources.

Although the application registry 52 and security registry 56 are depicted as residing within the security container 22, it is understood that this is only an example, and that other configurations would be possible (e.g., where one or both of the registries 52, 56 resides outside of the security container 22).

The audit module 58 is configured to maintain a log of resource requests and their decisions (allowed or denied) and/or of container operational action requests made for the various containers 30 on the host computing device 20 and their decisions (allowed or denied). This can be used to serve as an audit trail of access attempts, which may be useful in analyzing historic access data (e.g., to determine trends in access requests and their acceptance and/or denial).

The signing module 60 is configured to determine a digital signature of the container image data 30 and/or metadata file 38 of the various containers 24. This could be done in connection with determining whether a container 24 is already signed, or determining a signature to be stored in a container 24 if the container is un-signed or needs an updated signature. In one or more embodiments, the signature determinations are performed using a signing algorithm and symmetric encryption key that are known to the signing module 60. The signing module 60 may determine a signature based on metadata file 38, container image data 30, or a combination of the two (e.g., separate signatures for each). In one or more embodiments, if a container is signed its signature 40 is stored within the container. In one or more embodiments, permissions are determined for a given software container 24 based on whether the container is signed (e.g., preventing the container 24 from accessing other containers if it is unsigned and/or has an invalid signature).

The encryption engine 62 is configured to encrypt and decrypt files in the container image data 30. This may be used to provide seamless encryption and decryption between containers of a given logical application. Assume, for example, that container 24A requests data from container 24B. The encryption engine 62 may decrypt that data prior to delivering it to container 24A, such that the container 24A is unaware the data was being stored in encrypted form in container 24B. Similarly, the encryption engine 62 may encrypt data to be written to container 24B prior to delivering it to container 24B, such that container 24A is unaware that the data it provides is going to be encrypted. The encryption engine 62 may perform encryption for files located on a shared storage device and/or accessed over a network (e.g., a local area network "LAN", or wide area network "WAN" such as the Internet), for example.

In one example, when container image data 30 of a container 24 is encrypted, the metadata file 38 of the container 24 remains un-encrypted. In one example, encryption is only used for shared resources, and is not used for non-shared resources within a given container 24.

FIG. 2 schematically illustrates a method 100 of sharing a resource between software containers 24, with the method being implemented by a host computing device 20. The host computing device 20 detects a request from a first software container to access a resource of a different, second software container, an operational state of the second software container being controlled by a container engine 26 running on the host computing device 20 (block 102). For the discussion below, assume that the first software container is container 24A, and the second software container is container 24B. The host computing device 20 is instructed to accept or reject the request based on whether the first and second software containers 24A-B, which each contain a respective software application 42A-B, are part of a same logical software application (block 104).

FIG. 3 is a flowchart 120 of an example embodiment of the method 100 of FIG. 2. A resource access request is detected by the interception engine 28 (block 122). This could be a request to open a file, write to a file, or access a network port, for example. In one example, the detected resource request is received from the first software container 24A to access a resource of the second software container 24B. A determination is made of whether a container 24 is requesting its own resource (i.e., is the source and destination of the request the same container 24) (block 124). If so, the request is accepted (block 126). Otherwise, a check is performed to determine if the requesting container 24A is signed (block 125). If requesting container 24A is not signed, then the request is rejected (block 132).

Otherwise, a check is performed to determine if the first and second containers 24A-B are part of a same logical software application (block 128). Using the CRM example above, a check would be performed to determine if the webserver application 42A of container 24A and database application 42B of container 24B are part of the same logical software application. If the containers 24A-B are part of the same logical software application, the request is accepted (block 126).

Otherwise, if the first and second software containers 24A-B are not part of the same logical software application, then a determination is made of whether there is a rule in the security registry 56 that specifically indicates that the requested resource is marked as shared for the requesting first software container 24A (block 130). If a rule exists that marks the requested resource as shared for the requesting first software container 24A, then the request is accepted (block 126), and if it is not marked as shared for the first software container 24A (e.g., it is only shared for other containers, or is non-shared), then the request is rejected (block 132).

In one example, detecting the request (block 122) comprises intercepting the request before the request is delivered to the second software container 24B, instructing the host computing device 20 to accept the request (block 126) comprises instructing the host computing device 20 to deliver the request to the second software container 24B, and instructing the host computing device 20 to reject the request (block 132) comprises instructing the host computing device 20 to reject the request without delivering the request to the second software container 24B. Thus, in some embodiments the interception engine 28 truly intercepts the request, such that the recipient container whose resource is being requested (e.g., the second software container 24B) may not even be aware of a rejected request.

In other embodiments, to detect a request (block 122), the interception engine 28 receives a notification of the request, possibly from the second software container 24B itself, such that the second software container 24B is aware of pending requests while they are being considered according to the flowchart of FIG. 3.

Figure 4:
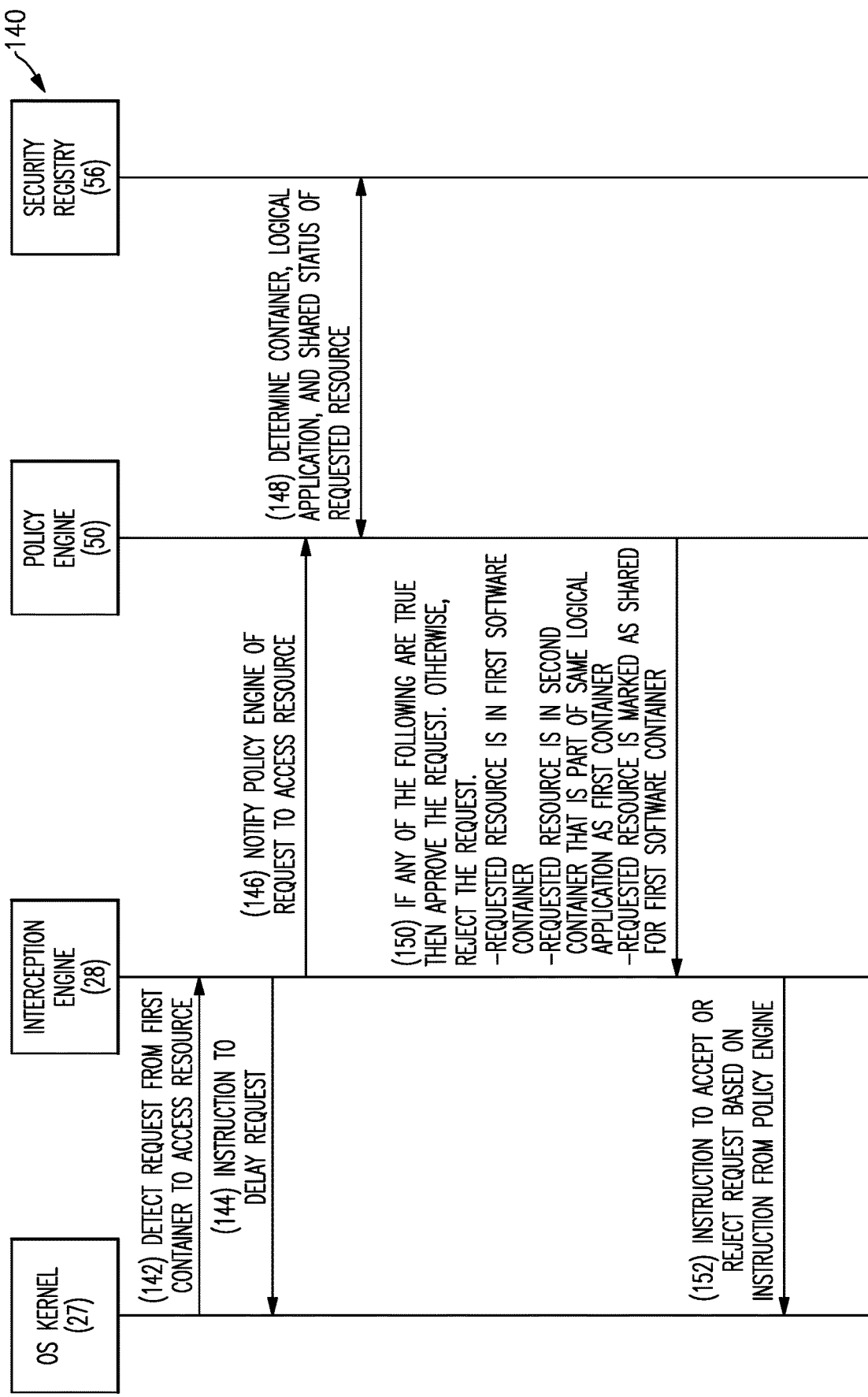
FIG. 4 is an example signaling diagram for the embodiment of FIG. 3.

FIG. 4 is an example signaling diagram for the embodiment of FIG. 3, which describes example involvement of the security container 22 in performing parts of the method 100. The interception engine 28 detects that the OS kernel 27 has received a request from a first software container 24A to access a resource of a second software container 24B (142), and provides an instruction to the OS kernel 27 to delay the request (144).

The interception engine 28 notifies the policy engine 50 of the request to access the resource (146). The policy engine 50 queries application registry 52 to determine a container and logical application of the requested resource (148). The policy engine 50 also queries security registry 56 to determine a shared status of the requested resource (149). In one example, the operating system 29 maintains a record of which resources belong to which containers, and item 148 includes a query to the OS (or to a cache where such relationships are stored). Of course, it is understood that this is only an example, and that a record of resource-to-container relationships could be stored elsewhere (e.g., in the application registry 52).

The policy engine 50 returns a decision of whether to accept or reject the request to the interception engine 28 (150). If any of the following items are true, the decision 150 is one to accept the request:
  the requested resource is in the requesting first software container ("yes" to block 124 in FIG. 3);
  the requested resource is in a second software container that is part of same logical application as first container (a "yes" to block 128 in FIG. 3); or
  a rule in the security registry 56 specifically indicates that the requested resource is marked as shared for the first software container (a "yes" to block 130 of FIG. 3).
Otherwise, the decision of 150 is one to reject the request.

The interception engine 28 receives the decision 150, and then provides an instruction to the OS kernel 27 of whether to accept or reject the request (152).

In one example, the instruction to delay the request (144) prevents the OS kernel 27 from notifying the second software container 24B that there is a pending resource request for one of its resources, such that the second software container 24B may remain unaware of the request if the request is rejected.

Figure 5:
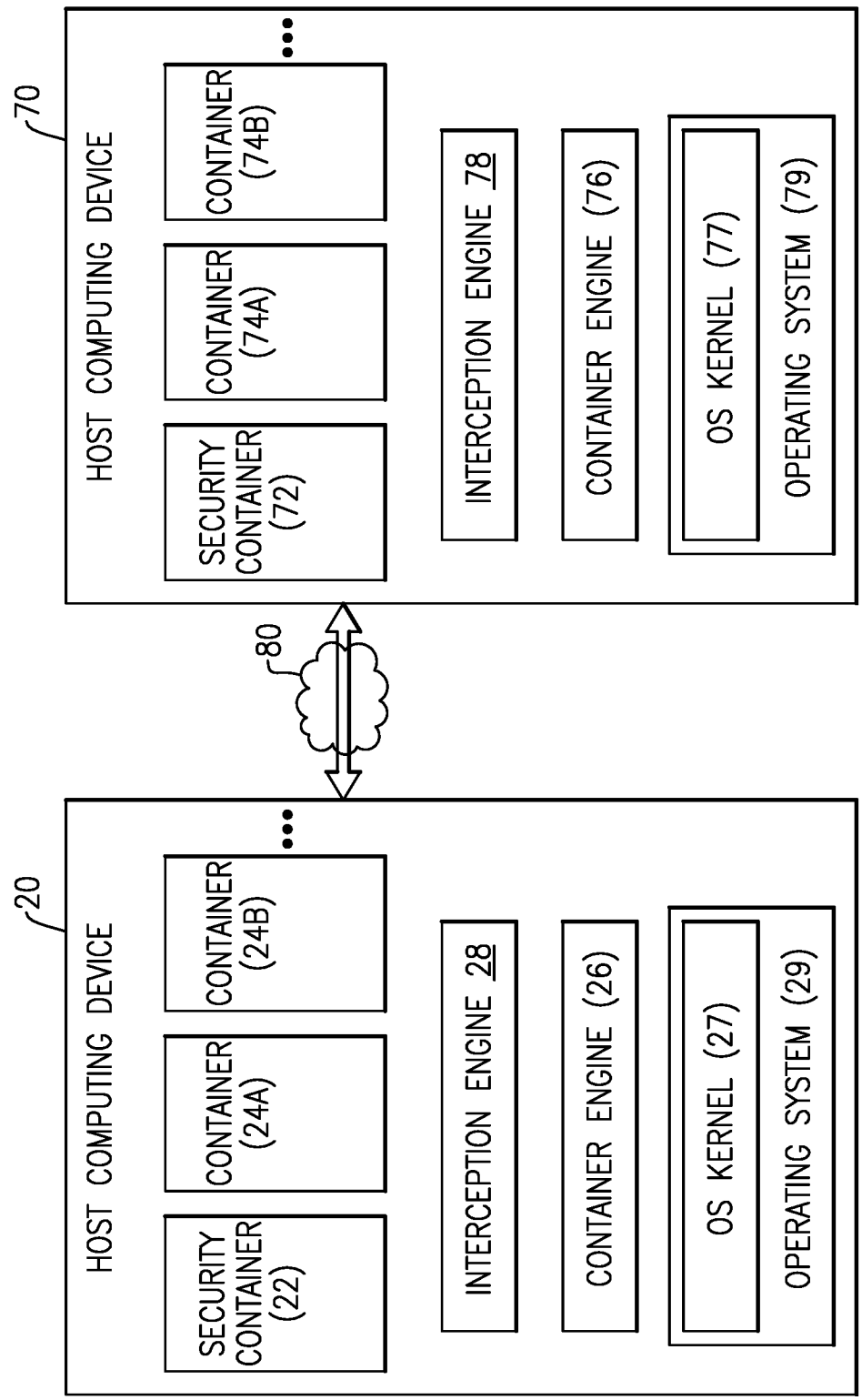
FIG. 5 schematically illustrates a configuration with between multiple host computing devices.

Although FIGS. 2-4 above have been discussed in the context of resource sharing between two software containers on a single host computing device 20, these techniques could be used for resource requests between software containers residing on different host computing devices. FIG. 5, for example, illustrates host computing device 20 and host computing device 70, which also includes a security container 72, software containers 74A-B, interception engine 78, container engine 76, and OS kernel 77, and OS 79. Items 72, 74, and 76-79 include the same functional components as the corresponding items 22, 24, and 26-29 on the host computing device 20. The host devices 20, 70 communicate via a network 80, which may be a local area network (LAN), or wide area network (WAN) such as the Internet.

Consider an example in which the "first software container" of block 102 is container 24A on host computing device 20, and the "second software container" of block 102 is software container 74A on host computing device 70. In some such examples, the method 100 may be performed by each of the host computing devices 20. The host computing device 20, whose container 24A issued the request, may perform the method 100 to determine if the request should even be delivered to host computing device 70 or should be terminated. In such an example, acceptance of the request in block 104 could correspond to delivery of the request to host computing device 70. Upon receiving the request, host computing device 70 may also perform the method 100 to determine whether the request should be accepted at its end (which acceptance could include delivery of the request to its container 74A, or an instruction to the container 74A, if it is already aware of the request, to accept the request).

Also, although a number of the methods discussed herein are described as being performed by the host computing device 20, it is understood that these methods are not limited to only the host computing device 20, and could also be performed by the host computing device 70.

Referring again to FIG. 3, the determination of whether the first and second software containers 24 are part of the same logical software application (block 128) may be performed based on a shared logical application ID, which may be a universally unique identifier (UUID). The determining of the UUID in block 124 may be based on any of the following, or a combination of the following, for example:
  a runtime parameter included in a request to start the second software container 24;
  one or more entries in the application registry 52;
  an environment variable accessible to the container engine 26; and
  a file in the second software container 24 (e.g., the metadata file 38).

Figure 6:
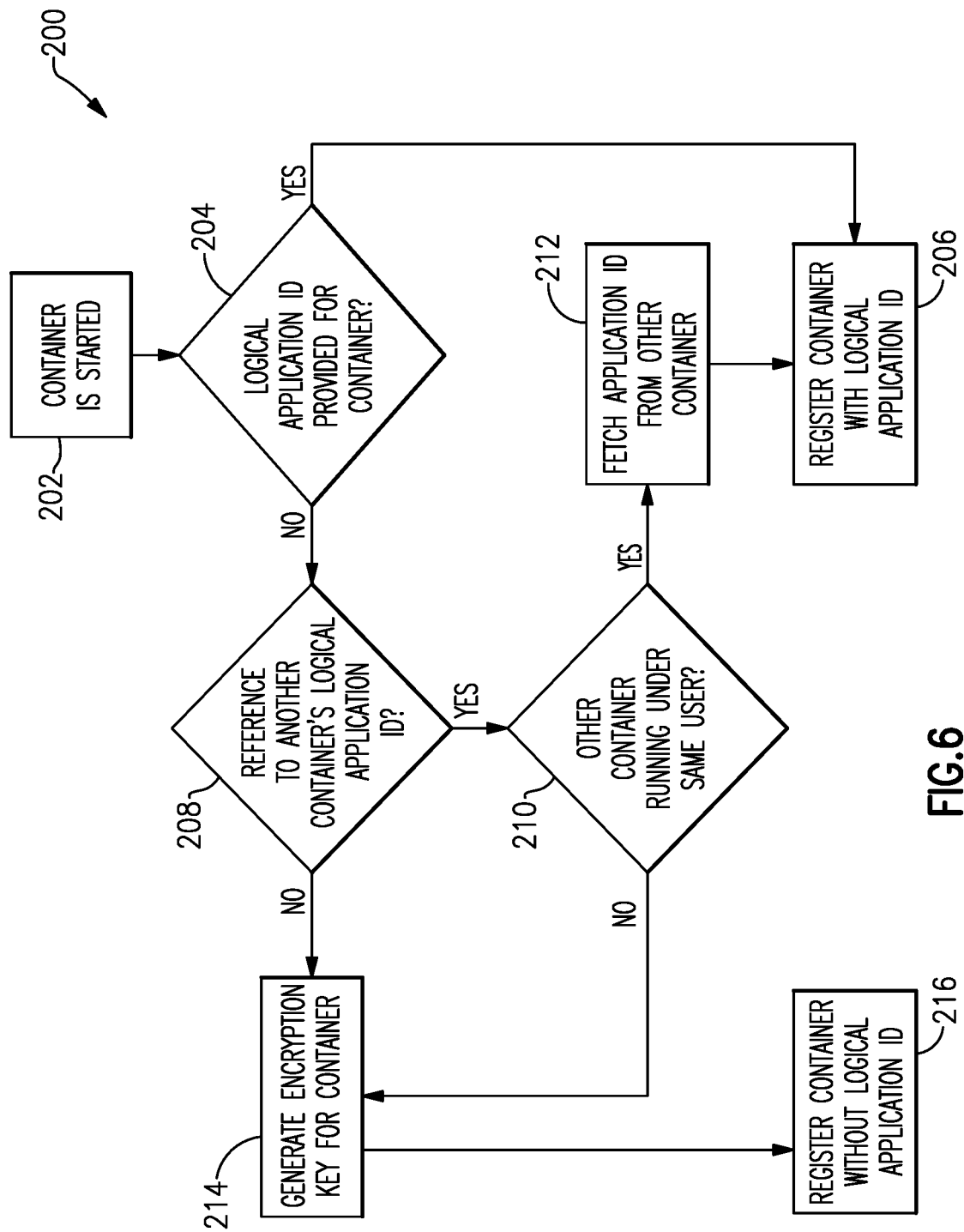
FIG. 6 schematically illustrates an example method of determining a logical software application of a software container.

FIG. 6 schematically illustrates an example method 200 of determining a logical software application of a software container. In the CRM example discussed earlier, the method 200 could be used for determining which software containers belong to the logical CRM application. For the discussion below, assume that a logical application ID is being determined for software application 42B in container 24B. The software container 24B is started (block 202), and a determination is made of whether a logical application ID is provided for the software application 42B (block 204).

Such a logical application ID may be provided through a number of mechanisms, such as through a dedicated environment variable specified when running the container, a file within the container, the application registry 52, or in runtime parameters used to start the container 24B in block 202. The logical application ID may be a UUID, for example. If such a logical application ID is present in the runtime parameters, then the software container 24B is registered using that logical application ID (block 206).

Otherwise, a determination is made of whether the runtime parameters include a reference to a logical application ID of another container (e.g., container 24A) (block 208). This may occur if a same user started both containers, for example. If such a reference is present (a "yes" to block 208), then a determination is made of whether the containers 24A, 24B are running under the same user (block 210). If they are running under the same user, then the logical application ID of container 24A is fetched (block 212), and the container 24B is registered with the fetched logical application ID (block 206). Otherwise, if there is a "no" to either block 208 or 210, an encryption key is randomly generated for the container (block 214), and the container 24B is registered without a logical application ID (block 216). In some embodiments, generation of the encryption key is omitted if no encryption will be performed for the container being started.

Figure 7:
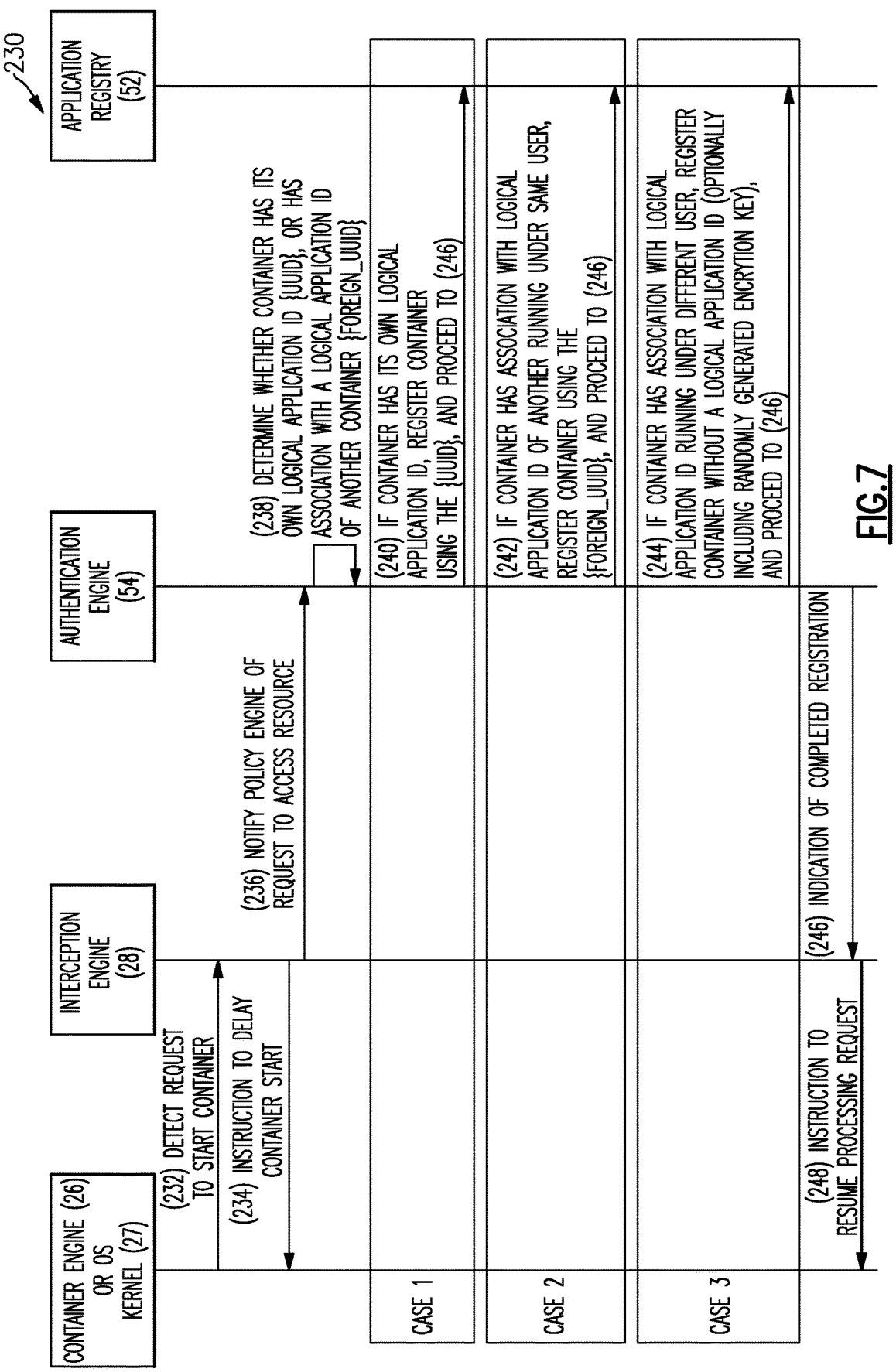
FIG. 7 is an example signaling diagram for the method of FIG. 6.

FIG. 7 is an example signaling diagram 230 of the method 200 of FIG. 6. The interception engine 28 detects a request to start container 24B (232), provides an instruction to delay the start of the container (234), and notifies the authentication engine 54 of the request to start the container (236). The authentication engine 54 determines whether the container 24B has its own logical application ID {UUID}, or has an association with a logical application ID of another container {foreign_UUID} (238). One of the following then occurs.

Case 1: If the container 24B has its own logical application ID, the container 24B is registered in the application registry 52 using the {UUID}, with the registration optionally including a randomly-generated security key (240).

Case 2: If the container 24B has an association with a {foreign_UUID} running under the same user, the container 24B is registered in the application registry 52 using the {foreign_UUID} (242).

Case 3: If the container 24B has an association with a {foreign_UUID} running under a different user, or has no association with a {foreign_UUID}, the container 24B is registered in the application registry 52 without a logical application ID, with the registration optionally including a randomly-generated encryption key (244).

The authentication engine 54 indicates to the interception engine 28 that the registration is complete (246), and the interception engine 28 instructs the container engine 26 to resume processing of the request of item 232.

In an alternative embodiment, item 234 is an acknowledgement of the detection, and is not an instruction to delay the container start, and item 248 is an indication that the registration is completed instead of an instruction to resume the starting of the container. In such an alternative, the starting of container 24B is performed concurrently with the registration operations of FIG. 7, such that a logical application ID determination does not delay the startup.

Items 232, 234, and 248 can transpire between the interception engine 28 and either the container engine 26 or the OS kernel 27, depending on how the interception engine 28 detects requests to start containers. In one example, items 232, 234, and 248 comprise interactions with the container engine 26, such that the container engine 26 is aware of the request to start container 24, and is instructed in item 234 to delay the request. In another example, items 232, 234, and 248 comprise interactions with the OS kernel 27, such that the container engine 26 may be unaware of items 236-246.

Figure 8:
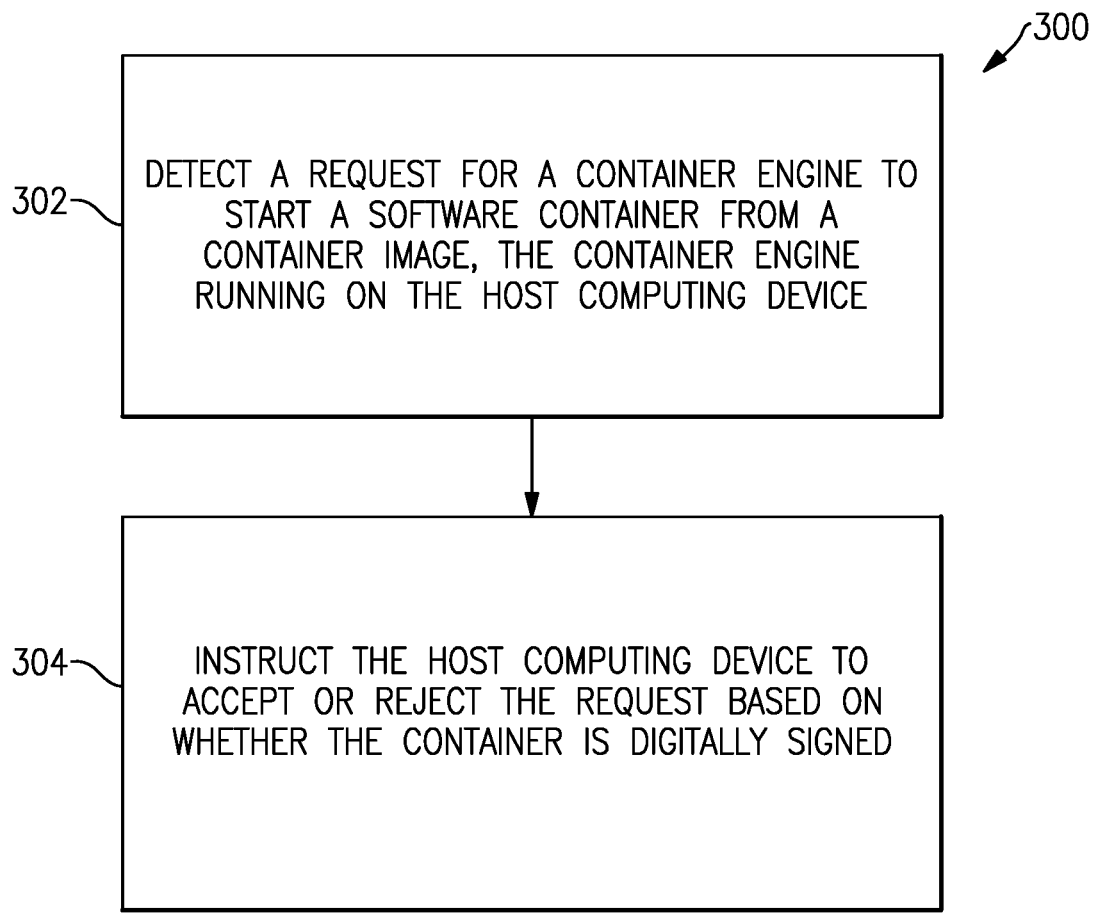
FIG. 8 schematically illustrates a method of controlling container startup.

Referring now to FIG. 8, a method 300 is disclosed that is implemented by a host computing device (e.g., 20 or 70) to control container startup. A request for container engine 26 to start a software container 24 from a container image is detected (block 302), with the container engine 26 running on the host computing device 20. The host computing device 20 is instructed to accept or reject the request based on whether the container 24 is digitally signed (block 304)

Figure 9:
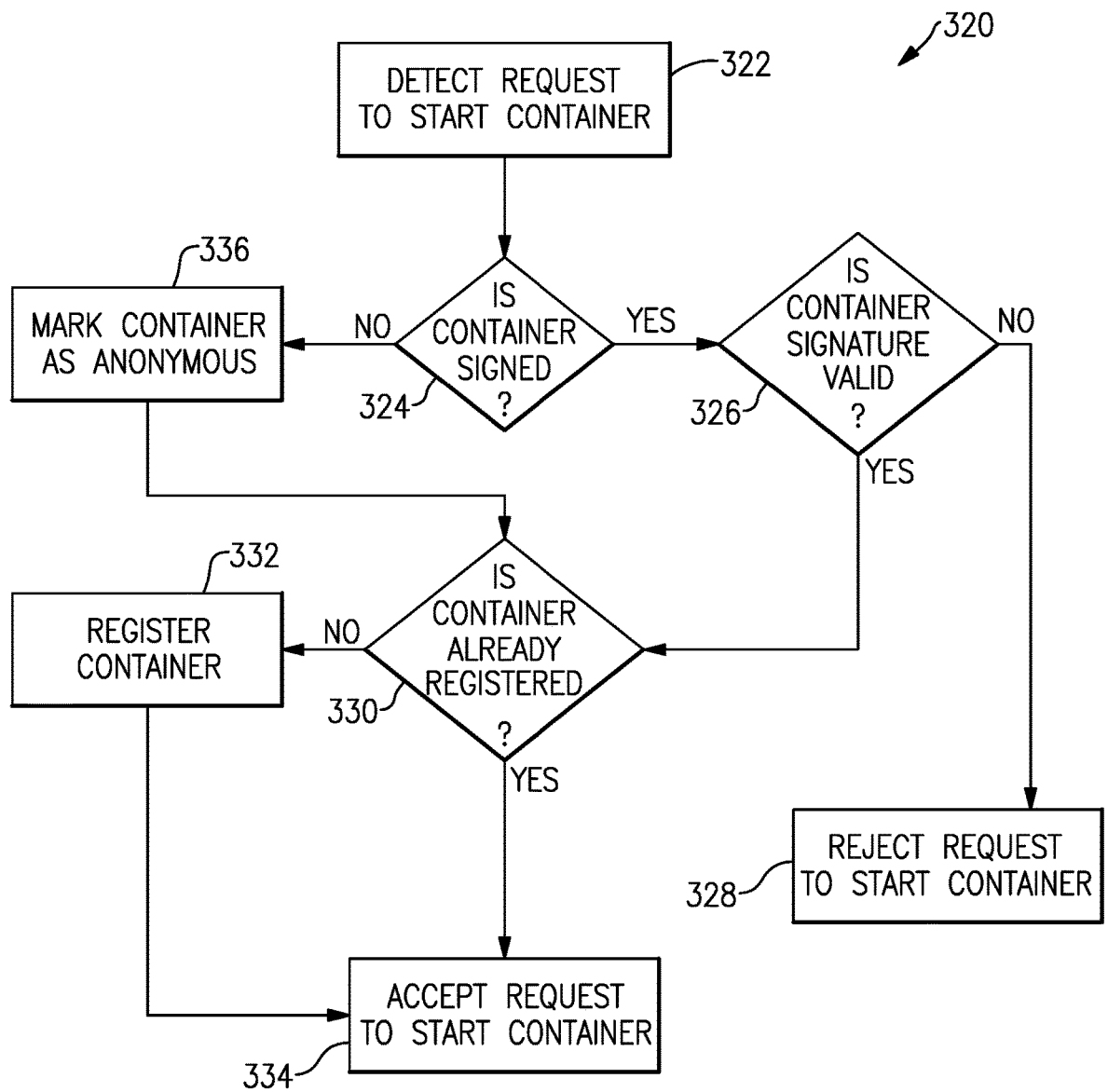
FIG. 9 schematically illustrates an example embodiment of the method of FIG. 8.

FIG. 9 schematically illustrates an example embodiment 320 of the method 300 of FIG. 8. A request to start a software container 24 is detected (block 322), and a determination is made of whether the container is 24 is digitally signed (block 324). As part of this determination, it is determined whether a digital signature is embedded within the software container 24. This digital signature could be one of the container image data 30 and/or metadata file 38 of the container 24, for example. If the container 24 is signed, a determination is made of whether the signature is valid (block 326). If the signature is invalid (indicating that the container may have been tampered with since its signing), then the request to start the container 24 is rejected (block 328).

If the signature is valid, a determination is made of whether the container is already registered (block 330), and if the container 24 is already registered, then the request of block 322 is accepted (block 334). If the container 24 is not yet registered (a "no" to block 330), then the container 24 is registered (block 332) prior to acceptance in block 334. Registration includes creating one or more records for the container 24 in the application registry 52. Referring again to block 324, if the container is not signed, it is marked as anonymous (block 336) before proceeding to the registration check of 330. Optionally, this may include generating a security key for use in subsequent signing of the container 24. As discussed above in connection with block 125 of FIG. 3, as a result of being designated as "anonymous" (i.e., unsigned), the anonymous container may be prevented from accessing resources of other containers.

Figure 10:
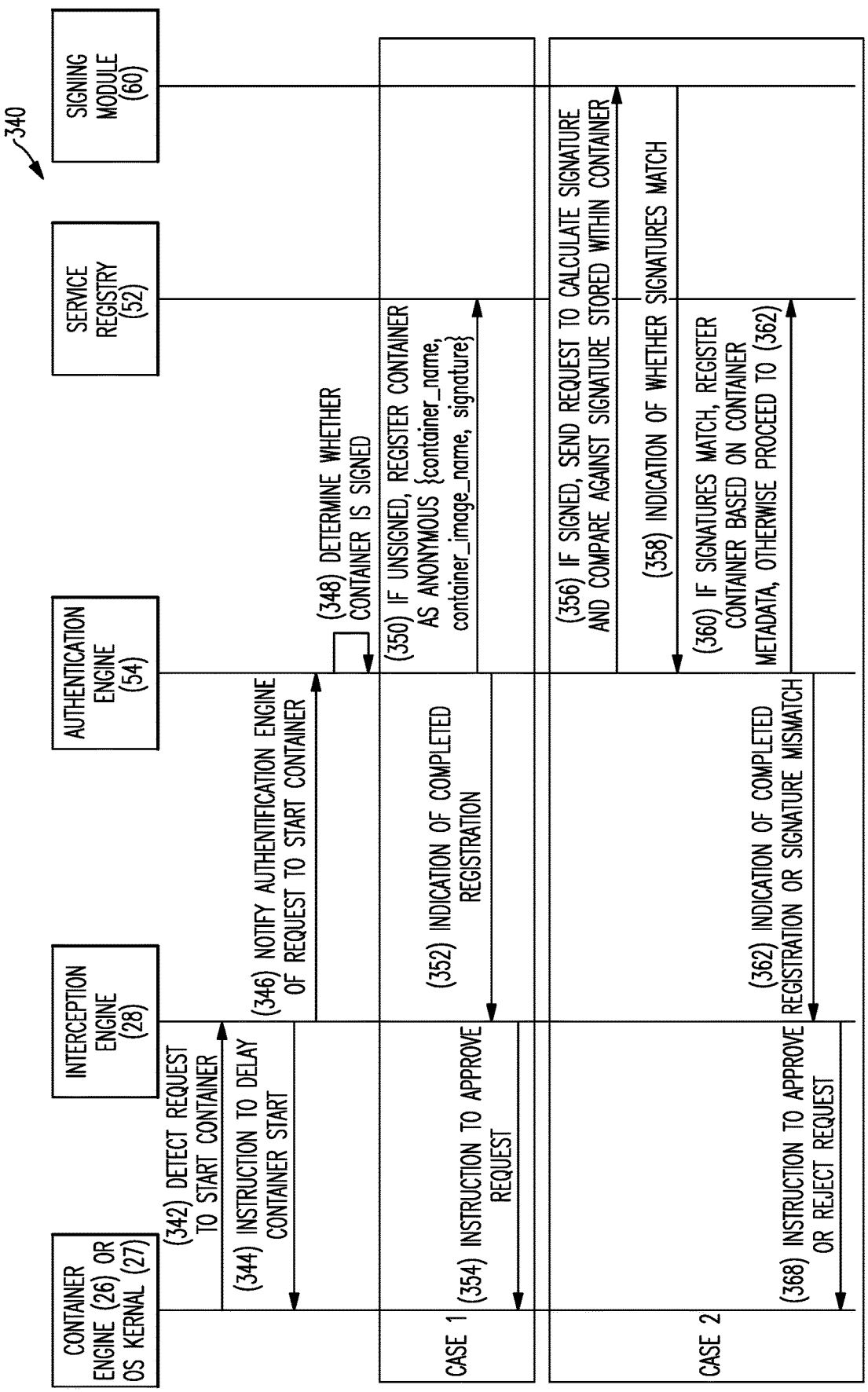
FIG. 10 is an example signaling diagram for the embodiment of FIG. 9.

FIG. 10 is an example signaling diagram 340 for the embodiment of FIG. 9. Interception engine 28 detects a request to start a container 24 (342), and provides an instruction to delay the request (344). The interception engine 28 notifies the authentication engine 54 of the request to start the container 24 (346), and the authentication engine 54 determines whether the container is signed (348). As discussed above, this could include a determination of whether a set of container data files in container image data 30 are signed and/or a request to determine if metadata file 38 is signed. Depending on whether the container 24 is signed, one of the following occurs.

Case 1: If the container 24 is unsigned, the authentication engine 54 registers the container 24 as anonymous in the application registry 52 (350). The corresponding entry in the application registry 52 includes a "container_name" of the container 24, a "container_image_name" that indicates which the container image in which the container 24 is stored, and a container signature, calculated from container files (e.g., from container image data 30 and/or metadata file 38) using a signing algorithm, such as the secure hashing algorithm 256 (SHA-256). The authentication engine 54 indicates to the interception engine 28 that the registration is complete (352), and the interception engine 28 provides an instruction to approve the request to start the container (354).

Case 2: If the container 24 is signed, the authentication engine 54 sends a request to signing module 60 to calculate a signature for the container 24, and compare that calculated signature against a signature 40 stored within the container 24 (356). The signing module 60 provides an indication of whether the signatures match (358).

If the signatures match, the authentication engine 54 registers the container 24 based on its container metadata (360), and provides an indication of completed registration to the interception engine 28 (362). Otherwise, if the signatures do not match (indicating that the container 24 is signed with a signature that is not valid and has likely been tampered with), registration is not performed, and item 362 corresponds to the authentication engine 54 providing an indication of a signature mismatch to the interception engine 28 (362). The interception engine 28 provides an instruction to approve or reject the request (368) based on the indication of 362.

Items 342, 344, 354, and 368 can transpire between the interception engine 28 and either the container engine 26 or the OS kernel 27, depending on how the interception engine 28 detects requests to start containers. In one example, items 342, 344, 354, and 368 comprise interactions with the container engine 26, such that the container engine 26 is aware of the request to start container 24, and is instructed in item 344 to delay the request. In another example, items 342, 344, 354, and 368 comprise interactions with the OS kernel 27, and if item 368 is an instruction to approve the request, item 368 comprises an instruction to deliver the request to the container engine 26; and if item 368 is an instruction to reject the request, item 368 comprises an instruction to reject the request without delivering the request to the container engine 26. Thus, in some examples the container engine 26 may be unaware of the request of item 342 if it is rejected.

Figure 11:
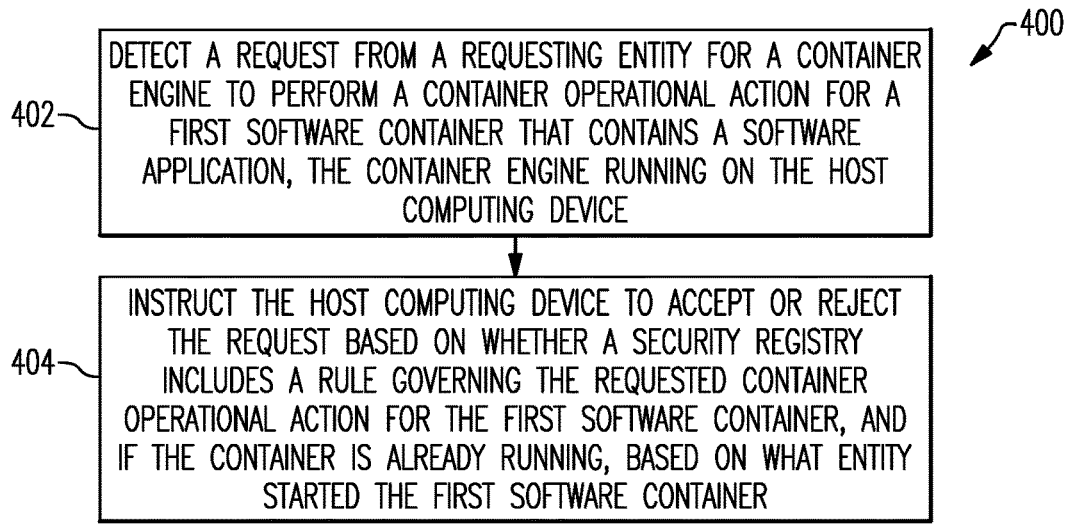
FIG. 11 schematically illustrates an example method for controlling container operational actions.

FIG. 11 schematically illustrates an example method 400 for controlling container operational actions. The method 400 is implemented by host computing device 20. A request is detected from a requesting entity for the container engine 26 to perform a container operational action for a first software container 24 that contains a software application 42 (block 402). The container engine 26 runs on the host computing device 20 (block 402). The host computing device 20 is instructed to accept or reject the request based on whether the security registry 56 includes a rule governing the requested container operational action access for the first software container 24, and if the container 24 is already running, based on what entity started the container (block 404).

The container operational action may include a request to preserve the state of the first software container 24 and/or its content (e.g., a request to save or export the container 24), or a request to control whether or not the first software container is running (e.g., a request to import the container 24 from a container image, a request to start the container 24 if it has already been imported, or a request to stop the container 24), for example. In DOCKER, for example, saving a container saves a current container state into an image which can later be started, while preserving the saved state; and exporting a container exports the container data into a file (e.g., an image file) that can later be imported and started on another machine, but does not maintain a state of the container. Similarly, starting a container starts a container from a saved state, whereas importing a container imports container files from a file (e.g., a container image) without a previous saved state of the container. Another example container operational action includes a request to log container activity (e.g., the audit module 58 logging resource requests and their decisions, requested container operational actions and their decisions, etc.).

Figure 12:
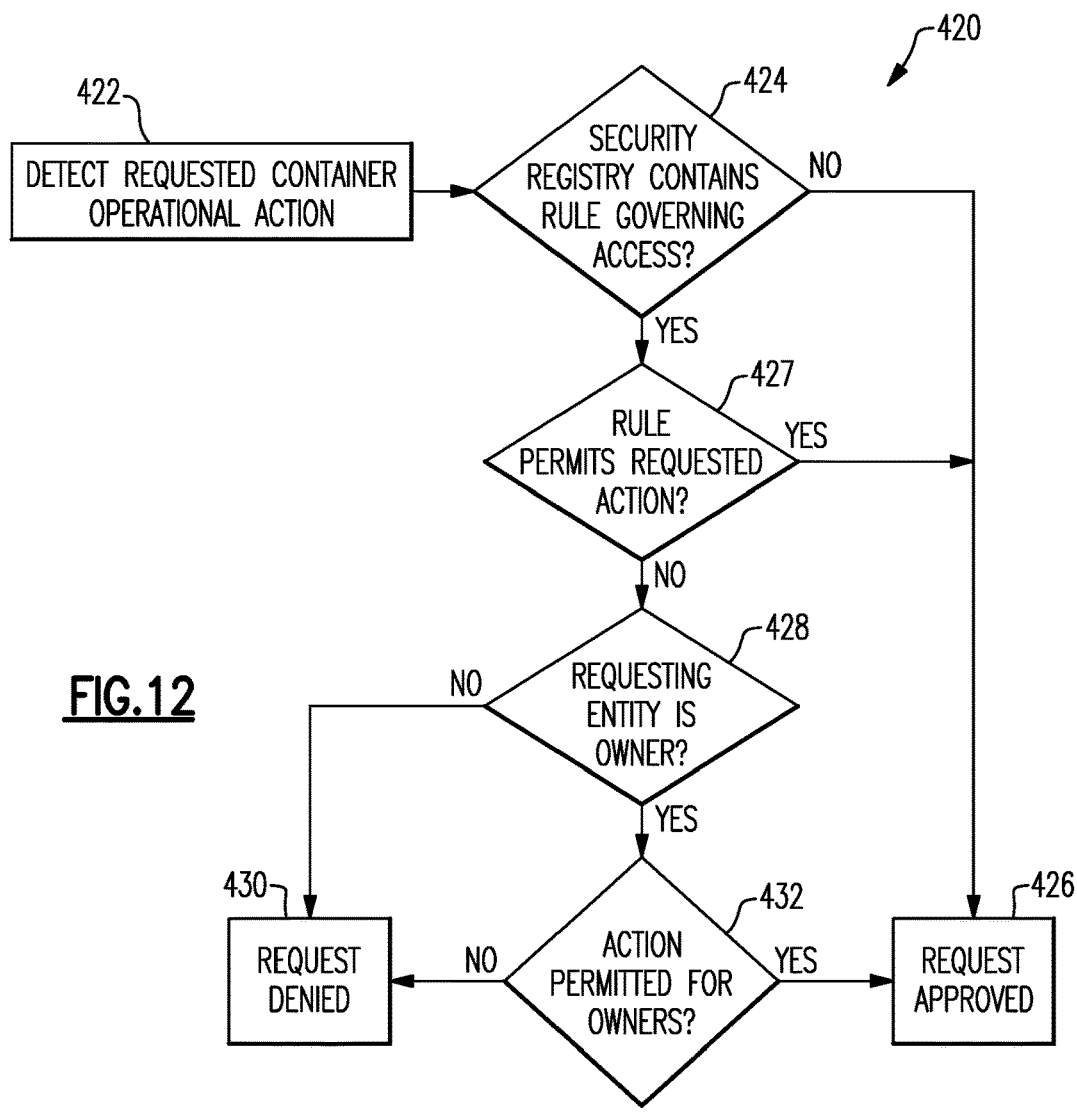
FIG. 12 schematically illustrates an example embodiment of the method of FIG. 11.

FIG. 12 schematically illustrates an example embodiment 420 of the method 400 of FIG. 11. A requested container operational action is detected (block 422), and a determination is made of whether the security registry 56 includes a rule governing the requested container operational for the first software container 24 (block 424). If there is no rule (a "no" to block 424), then the request is approved (block 426).

If there is a rule that governs the requested container operational action for the first software container 24 (a "yes" to block 424), then a determination is made of whether the rule permits the requested container operational action (block 427). If the rule permits the requested action (a "yes" to block 426), then the request is approved (block 426).

If the rule does not permit the requested action, then a determination is made of whether the requesting entity is an owner of the resource (block 428). In one or more embodiments, the requesting entity (which could be a user or software) becomes an owner if the container is running and the requesting entity is the one that started the container. If the requesting entity is not an owner of the first container 24, the requested container operational action is denied (block 430).

If the requesting entity is an owner, then a determination is made of whether the requested operational action is permitted for owners (block 432). If it is permitted, the request is approved (block 426), and if not the request is rejected (block 430). Thus, some container operational actions may be prohibited in general (a "no" to block 426), but still be permitted for owners (a "yes" to block 432). In one or more embodiments, all container operational actions for a given container are permitted for an owner of the container, despite the existence of a rule (block 426) that otherwise prohibits such actions for certain non-owners.

Figure 13:
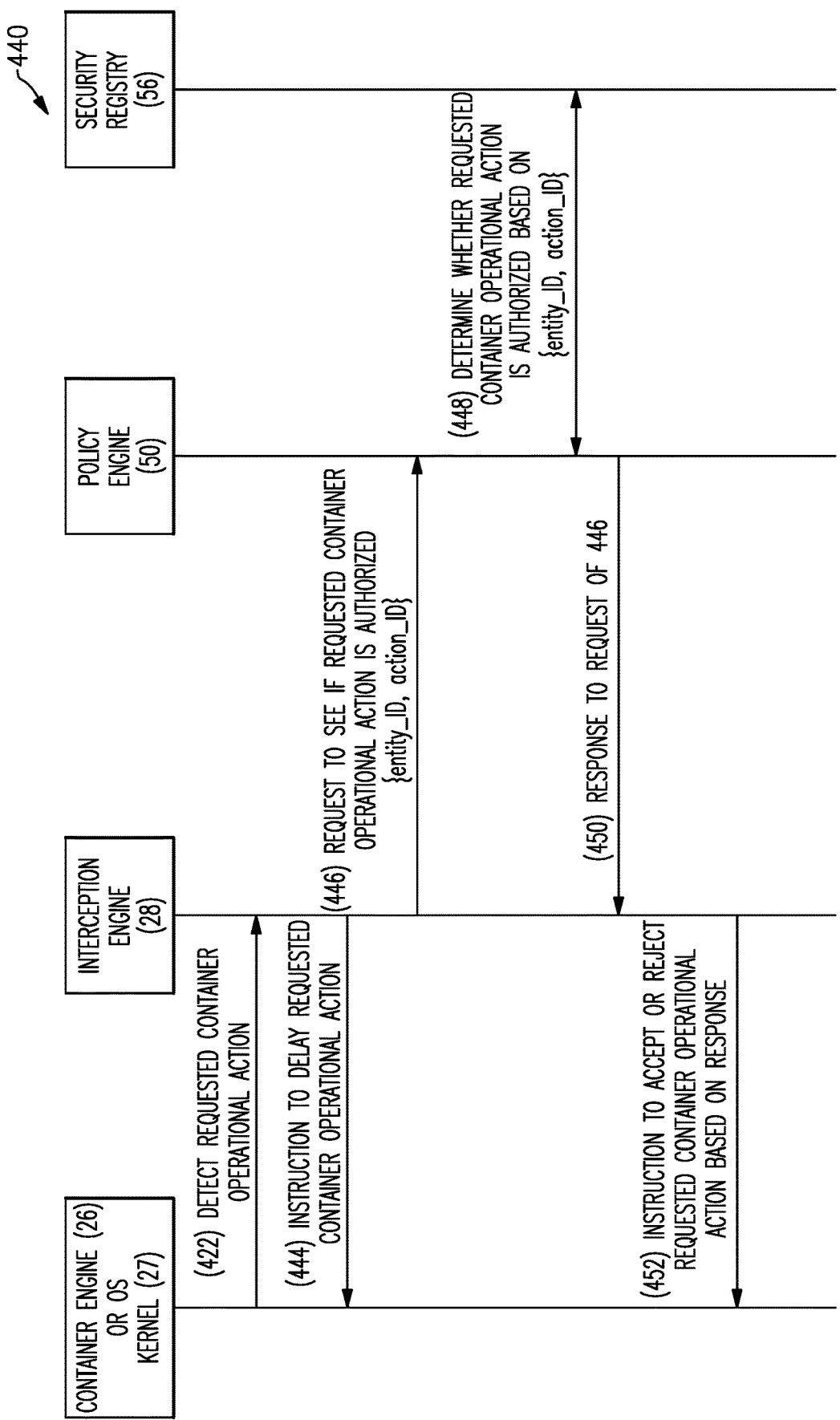
FIG. 13 is an example signaling diagram for the embodiment of FIG. 12.

FIG. 13 is an example signaling diagram 440 for the embodiment 420 of FIG. 12. The interception engine 28 detects a requested container operational action (442), and provides an instruction to delay the request (444). In one or more embodiments, the detection is performed by proxying the container engine 26, such that any request that is intended for the container engine 26 will be detected by the interception engine 28. In one example, this is implemented using Unix socket proxying, file system driver proxying, network proxying, process instrumentation, or the like. In Unix socket proxying, a standard UNIX socket is replaced with a custom socket, such that a client will connect to the custom socket instead of the standard one. In another example, the container engine 26 is configured (e.g., using a plugin) to pass through requests that it receives to the interception engine 28 (e.g., without proxying the container engine 26).

The interception engine 28 transmits its own request to the policy engine 50 to see if the requested container operational is authorized (446). The request of 446 includes the following parameters: an identifier of the requesting entity ("entity_id"), and an identifier of the requested container operational action ("action_ID").

The policy engine 50 accesses security registry 56 to determine whether the requested container operational action is authorized based on the "entity_ID" and "action_ID" parameters (448), and provides a response to the interception engine 28 (450). In one or more embodiments, only administrative users and other containers are allowed to perform container operational actions, and non-administrative users are prohibited from performing some or all container operational actions unless they are an "owner" of a container (e.g., they were the one that started a container). Based on the response of 450, the interception engine 28 provides an instruction for whether the requested container operational action should be accepted or rejected (452).

Items 442, 444, and 452 can transpire between the interception engine 28 and either the container engine 26 or the OS kernel 27, depending on how the interception engine 28 detects requests for container operational actions. In one example, items 442, 444, and 452, comprise interactions with the container engine 26, such that the container engine 26 is aware of requested container operational action, and is instructed to delay them. In another example, items 442, 444, 452 comprise interactions with the OS kernel 27, and if item 452 is an instruction to approve the request, item 452 comprises an instruction to deliver the request to the container engine 26; and if item 368 is an instruction to reject the request, item 368 comprises an instruction to reject the request without delivering the request to the container engine 26. Thus, in some examples the container engine 26 may be unaware of the request of 442 if the request is rejected.

Figure 14:
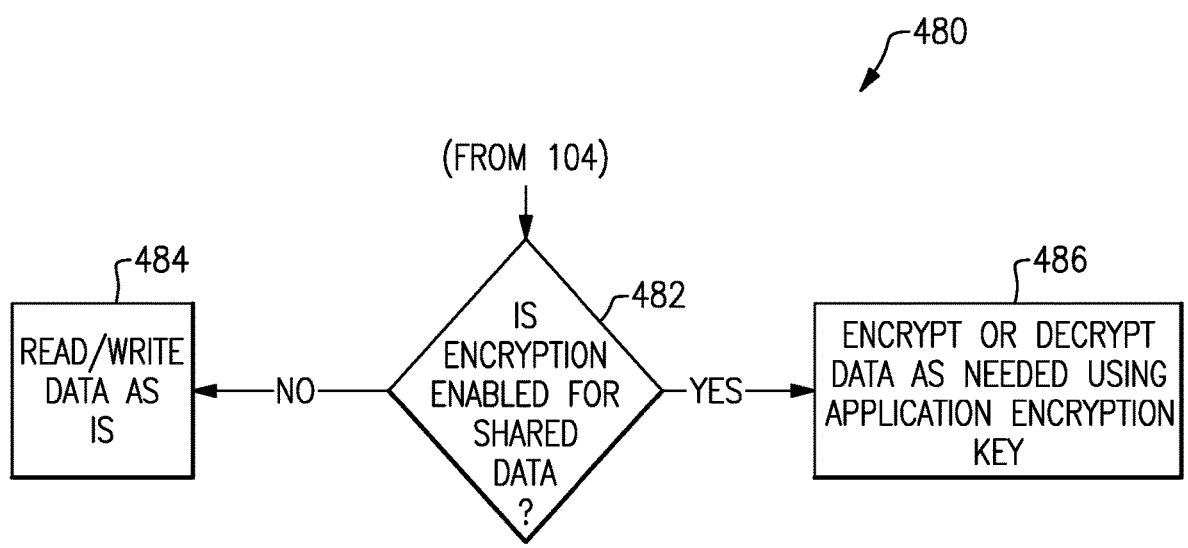
FIG. 14 schematically illustrates an example embodiment of the method of FIG. 2 in which encryption is supported.

FIG. 14 schematically illustrates an example embodiment 480 of the method 100 of FIG. 2 in which encryption is supported. Assume for this discussion that blocks 102 and 104 of FIG. 2 have been performed, that the detected resource request includes a read or write attempt for container image data 30, and that the request has been approved. A determination is made of whether encryption is enabled for the shared container image data (block 482). If encryption is not enabled, then the data is read or written as is (block 484). Otherwise, if encryption is enabled, then the data is encrypted or decrypted as needed using an encryption key of the application 42 in the container 24 for which the request was received (i.e., the container 24 containing the data being read or written) (block 486). The encryption and/or decryption is performed by the encryption engine 62.

As discussed above, this may be used to provide seamless encryption and decryption between containers of a given logical application, without requiring the containers to manage encryption keys. For example, if container 24A requested read/write access to encrypted data in container 24B, in some embodiments container 24A would not need to perform the encryption/decryption and/or even know whether the data even requires any encryption/decryption processing because all of that functionality could be hidden from the container 24A by the security container 22.

In one example, containers may have their own encryption keys that are known to the security container 22. In other examples, (e.g., block 214 of FIG. 6), an encryption key may be randomly generated for a container and/or its logical application by the encryption engine 62.

In one example, an indication of whether or not encryption is to be used is provided through an optional flag when a container 24 is started.

Figure 15:
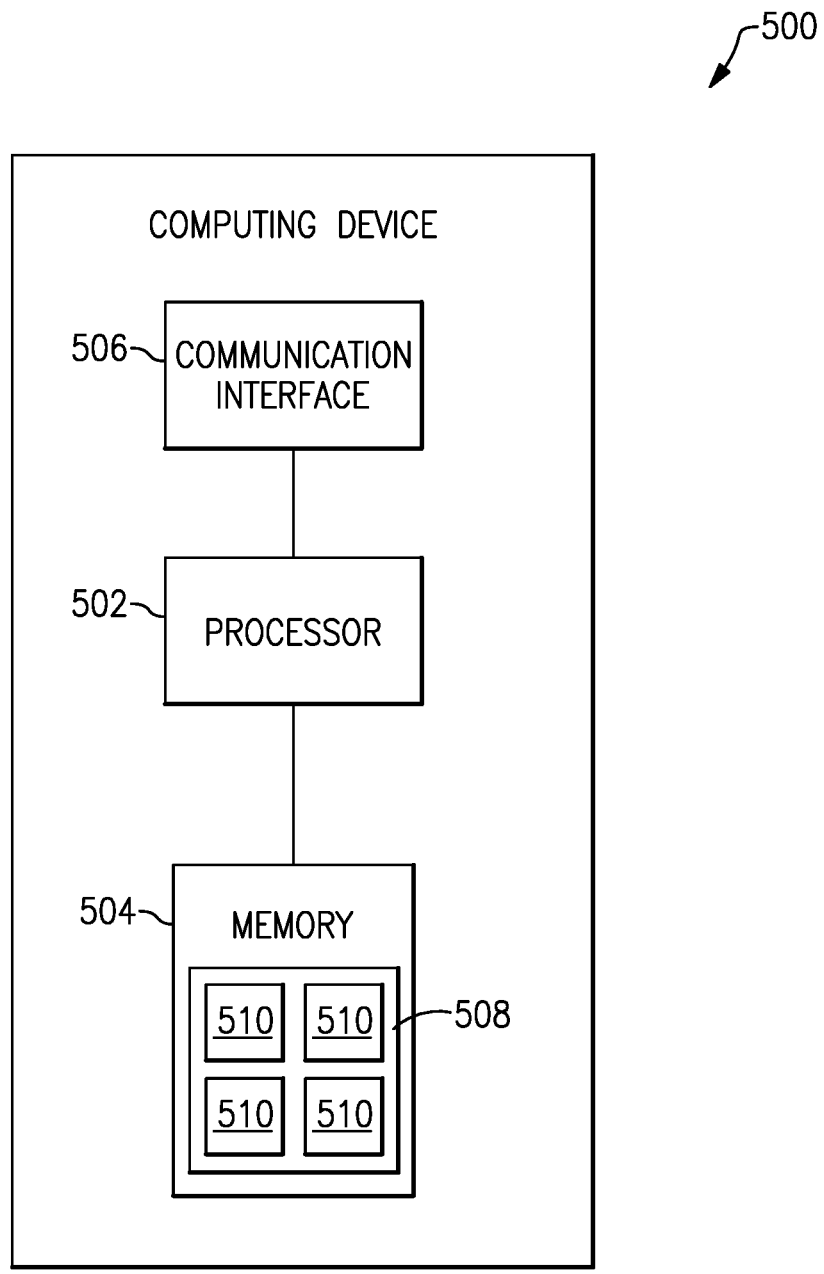
FIG. 15 schematically illustrates an example host computing device.

FIG. 15 schematically illustrates an example computing device 500 that may be used for the host computing devices 20, 70, and may be configured to implement any of the methods discussed above, either alone or in any combination. The computing device 500 includes one or more processing circuits (shown as "processor" 502) that may be configured to carry out any of the techniques of the techniques above. The processor 502 may include one or more microprocessors, microcontrollers, application specific integrated circuits (ASICs), or the like, for example. The computing device 500 also includes memory 504, which may include one or several types of memory such as read-only memory (ROM), random-access memory, cache memory, flash memory devices, optical storage devices, etc. In one example, the memory 504 includes a container repository 508 which stores a plurality of stored container images 510, from which containers 24 can be started. A communication interface 506 is configured to facilitate communication with other computing devices (e.g., if the interface 506 includes a networking interface) and/or with user input devices (e.g., if the interface 506 includes a wired or wireless interface for receiving and/or providing user input). The processor 502 is operatively connected to both the memory 504 and the communication interface 506.

In one example, the computing device 500 is a host computing device, and the memory 504 is configured to store the second software container 24B (e.g., in one of the container images 510). In this example, the processing circuitry 502 is configured to detect a request from first software container 24A, which is different from the second software container 24B, to access a resource of the second software container 24B; and the processing circuitry 502 is further configured to accept or reject the request based on whether the first and second software containers 24A-B, which each contain a respective software application 42, are part of a same logical software application.

In one example, the computing device 500 is a host computing device, the memory 504 is configured to store a container image 510 and container engine 26, and the processing circuitry is configured to detect a request for the container engine 26 to start a software container 24 from the container image 510, and accept or reject the request based on whether the software container 24 is digitally signed.

In one example, the computing device 500 is a host computing device, the memory 504 is configured to store container engine 26 and a first software container 24A (e.g., in one of the container images 510), and the processing circuitry 502 is configured to detect a request from a requesting entity for the container engine 26 to perform a container operational action for the first software container 24A, which contains a software application 42A. In this example, the processing circuitry 502 is further configured to accept or reject the request based on whether security registry 56 includes a rule governing the requested container operational action for the first software container 24A, and if the container is already running, based on what entity started the first software container 24A.

The methods and devices discussed herein provide considerable improvements over the rigid, manual process of the prior art for enabling and controlling resource sharing between containers, by facilitating dynamic resource sharing between containers, and dynamic control of requested container operational actions.

In some embodiments, software containers are isolated from each other, and resource sharing between the containers is controlled based on application context (e.g., whether the containers are part of a same logical software application) (see, e.g., FIGS. 2-4). Thus, in some embodiments where both containers are part of a same logical application, resources can be shared implicitly without requiring an explicit access policy to permit such sharing. In the same or other embodiments, resources can also be shared explicitly based on policy (e.g., policies that indicate whether containers that are part of different logical applications can access each other's resources).

In the same or other embodiments, an identification method is provided for software containers, which allows granting implicit and explicit permissions to containers based on their identification (see, e.g., FIGS. 6-7).

In the same or other embodiments, a seamless encryption/decryption method is provided, allowing different containers of a same logical application to share encrypted data without the need to manage encryption keys (see, e.g., FIG. 14).

In the same or other embodiments, seamless operational control of containers is provided for container administration, allowing users to manage their container environment without the need to maintain explicit policies (see, e.g., FIGS. 8-13).

Although a number of example embodiments have been disclosed, a worker of ordinary skill in this art would recognize that certain modifications would come within the scope of this disclosure. For that reason, the following claims should be studied to determine the true scope and content of this disclosure.

What is claimed is:

1. A method of sharing a resource between software containers, the method implemented by a host computing device and comprising:

detecting a request from a first software application in a first software container to access a resource of a second software application operating in a second software container that is different from the first software container, an operational state of the second software container being controlled by a container engine running on the host computing device;

determining whether the first and second software applications are part of a same logical software application; and accepting or rejecting the request based on the determination, said accepting or rejecting comprising accepting the request based on the first and second software applications being part of the same logical software application;
wherein the determining is based on one or more of:
a runtime parameter included in a request to start the second software container; and
an environment variable accessible to the container engine.

2. The method of claim 1, wherein:
detecting the request comprises intercepting the request before the request is delivered to the second software container;
accepting the request comprises delivering the request to the second software container; and
rejecting the request comprises rejecting the request without delivering the request to the second software container.

3. The method of claim 1, wherein said accepting or rejecting comprises:
determining whether the requested resource is marked as shared for the first software container by an entry in a security registry; and
based on the first and second software applications being part of different logical software applications:
accepting the request based on the requested resource being marked as shared for the first software container by an entry in the security registry; and
rejecting the request based on the requested resource not being marked as shared for the first software container.

4. The method of claim 1, comprising:
controlling an operational state of the first software container by a container engine running on a computing device that is different from the host computing device.

5. The method of claim 1, comprising:
accepting an additional request to access a resource in the second software application based on the additional request being received from the second software container.

6. The method of claim 1, wherein said accepting or rejecting the request is further based on whether the first software container is digitally signed.

7. The method of claim 1, comprising:
in response to the requested resource being an encrypted file in the second software container and the request being one to open the file, decrypting the encrypted file prior to providing the file to the first software container; and
in response to the requested resource being an encrypted file in the second software container and the request being one to write data to the file, receiving the data from the first software container in unencrypted form and encrypting the data prior to saving it in the encrypted file in the second software container.

8. A host computing device comprising:
memory configured to store a second software container; and
processing circuitry operatively connected to the memory and configured to:
detect a request from a first software application in a first software container that is different from the second software container to access a resource of a second software application in the second software container; and
make a determination of whether the first software application and second software application are part of a same logical software application;
accept or reject the request based on the determination, including accepting the request based on the first and second software applications being part of a same logical software application;
wherein the determination is performed based on one or more of:
a runtime parameter included in a request to start the second software container; and
an environment variable accessible to the container engine.

9. The host computing device of claim 8, wherein:
to detect the request, the processing circuitry is configured to intercept the request before the request is delivered to the second software container;
to accept the request, the processing circuitry is configured to deliver the request to the second software container; and
to reject the request, the processing circuitry is configured to prevent delivery of the request to the second software container.

10. The host computing device of claim 8, wherein the processing circuitry is configured to:
determine whether the requested resource is marked as shared for the first software container; and
based on the first and second software applications being part of different logical software applications:
accept the request based on the requested resource being marked as shared for the first software container by an entry in a security registry; and
reject the request based on the requested resource not being marked as shared for the first software container.

11. The host computing device of claim 8, wherein an operational state of the second software container is controlled by a container engine running on the host computing device, and an operational state of the first software container is controlled by a container engine running on a computing device that is different from the host computing device.

12. The host computing device of claim 8, wherein the processing circuitry is configured to accept an additional request to access a resource of the second software application based on the additional request being received from the second software container.

13. The host computing device of claim 8, wherein the processing circuitry is configured to accept or reject the request based on whether the first software container is digitally signed.

14. The host computing device of claim 8, wherein:
based on the requested resource being an encrypted file in the second software container and the request being one to open the file, the processing circuitry is configured to decrypt the encrypted file prior to providing the file to the first software container; and
based on the requested resource being an encrypted file in the second software container and the request being one to write data to the file, the processing circuitry is configured to receive the data from the first software container in unencrypted form and encrypt the data prior to saving it in the encrypted file in the second software container.

15. A method of sharing a resource between software containers, the method implemented by a host computing device and comprising:
detecting a request from a first software application in a first software container to access a resource of a second software application operating in a second software container that is different from the first software container, an operational state of the second software container being controlled by a container engine running on the host computing device; and accepting or rejecting the request based on whether the first and second software applications are part of a same logical software application;

wherein the first software application in the first software container is a webserver application;

wherein the second software application in the second container is a database application; and wherein the logical software application that the webserver application and database application are part of is a Customer Relationship Management (CRM) system.

16. A host computing device comprising:

memory configured to store a second software container; and processing circuitry operatively connected to the memory and configured to:
- detect a request from a first software application in a first software container that is different from the second software container to access a resource of a second software application in the second software container; and
- accept or reject the request based on whether the first and second software applications are part of a same logical software application, wherein the first software application in the first software container is a webserver application;

wherein the second software application in the second container is a database application; and wherein the logical software application that the webserver application and database application are part of is a Customer Relationship Management (CRM) system.

* * * * *